US012507017B2

(12) United States Patent
Scheek

(10) Patent No.: US 12,507,017 B2
(45) Date of Patent: Dec. 23, 2025

(54) SPEAKER UNIT

(71) Applicant: Mayht Holding B.V., Santa Barbara, CA (US)

(72) Inventor: Timothy Ruben Scheek, Rotterdam (NL)

(73) Assignee: Mayht Holding B.V., Goleta, CA (US)

( * ) Notice: Subject to any disclaimer, the term of this patent is extended or adjusted under 35 U.S.C. 154(b) by 149 days.

(21) Appl. No.: 18/557,514

(22) PCT Filed: May 12, 2021

(86) PCT No.: PCT/NL2021/050308
§ 371 (c)(1),
(2) Date: Oct. 26, 2023

(87) PCT Pub. No.: WO2022/240284
PCT Pub. Date: Nov. 17, 2022

(65) Prior Publication Data

US 2024/0223960 A1 Jul. 4, 2024

(51) Int. Cl.
*H04R 9/06* (2006.01)
*H04R 7/18* (2006.01)
*H04R 9/02* (2006.01)

(52) U.S. Cl.
CPC ................. *H04R 9/06* (2013.01); *H04R 7/18* (2013.01); *H04R 9/025* (2013.01); *H04R 2400/11* (2013.01)

(58) Field of Classification Search
CPC . H04R 9/06; H04R 7/18; H04R 9/025; H04R 2400/11

(Continued)

(56) References Cited

U.S. PATENT DOCUMENTS 4,191,863 A * 3/1980 Matsuda ................ H04R 9/063 381/431
4,989,254 A * 1/1991 Amalaha .................. H04R 7/12 381/430

(Continued)

FOREIGN PATENT DOCUMENTS

EP 1389853 A1 2/2004
KR 20130027632 A 3/2013

(Continued)

OTHER PUBLICATIONS

AudioTron Quick Start Guide, Version 1.0, Mar. 2001, 24 pages.

(Continued)

*Primary Examiner* — Suhan Ni
(74) *Attorney, Agent, or Firm* — Fortem IP LLP

(57) ABSTRACT

A speaker unit (1) comprising a speaker frame (2) with a major front surface (3) and an opposing major back surface (4), a membrane (5) movably arranged in the major front surface (3) along a main speaker axis (A) substantially perpendicular to the major front surface (3); one or more drive units (6) configured to drive the membrane (5), wherein each drive unit of the one or more drive units (6) comprises a driver static part (7) and a driver moving part (8), wherein the driver static part (7) is mounted to the speaker frame (2) and wherein the driver moving part (8) is connected to the membrane (5); wherein the driver static part (7) comprises an tubular shell (9) enclosing a chamber (10) and having one or more magnets (11) arranged in the chamber (10), and wherein the driver moving part (8) is moveably arranged along the tubular shell (9).

21 Claims, 3 Drawing Sheets

(58) Field of Classification Search
USPC .................................................. 381/410, 420
See application file for complete search history.

(56) References Cited

U.S. PATENT DOCUMENTS

| | | | | |
|---|---|---|---|---|
| 5,440,644 | A | 8/1995 | Farinelli et al. | |
| 5,761,320 | A | 6/1998 | Farinelli et al. | |
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 8,948,423 | B2 * | 2/2015 | Kim | H04R 1/24 381/396 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2004/0136560 | A1 * | 7/2004 | Walsh | H04R 9/06 381/401 |
| 2006/0126885 | A1 * | 6/2006 | Combest | H04R 9/063 381/401 |
| 2006/0233403 | A1 * | 10/2006 | Nakagawa | H04R 1/227 381/182 |
| 2007/0142944 | A1 | 6/2007 | Goldberg et al. | |
| 2008/0317255 | A1 * | 12/2008 | Cozens | H04R 9/10 381/182 |
| 2015/0271605 | A1 * | 9/2015 | Zhang | H04R 9/025 381/401 |
| 2018/0048963 | A1 | 2/2018 | Pan | |
| 2020/0344554 | A1 * | 10/2020 | Scheek | H04R 7/18 |

FOREIGN PATENT DOCUMENTS

| | | | |
|---|---|---|---|
| WO | 200153994 | | 7/2001 |
| WO | 2003093950 | A2 | 11/2003 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D M Holdings* (No. 14-1330-RGA), DI 219, Claim Construction Opinion (Jan. 12, 2017) (24 pages).

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

International Bureau, International Preliminary Report on Patentability, mailed on Nov. 23, 2023, issued in connection with International Application No. PCT/US2021/050308, filed on May 12, 2021, 10 pages.

International Bureau, International Search Report and Written Opinion mailed on Feb. 7, 2022, issued in connection with International Application No. PCT/NL2021/050308, filed on May 12, 2021, 12 pages.

* cited by examiner

SPEAKER UNIT

CROSS REFERENCE TO RELATED APPLICATION

The present application is a 371 national phase of International Patent Application No PCT/NL2021/050308, filed May 12, 2021, which is incorporated herein by reference in its entirety.

FIELD OF THE INVENTION

The present invention relates to a speaker unit.

BACKGROUND ART

Prior art electrodynamic loudspeakers use magnets and a magnetic circuit of pole pieces, a back plate and a top plate, which channel the magnetic field into a magnetic gap. In the magnetic gap a voice coil is positioned which is mechanically coupled to a conus producing the sound waves. Other principles are used in loudspeakers of the electrostatic type and planar loudspeakers. For electrodynamic type of loudspeakers, the inductance increases when increasing the power capacity of the loudspeaker, the sensitivity is relatively limited and the structure requires a large format in view of the maximum sound level that can be produced.

The electrostatic and planar type of loudspeakers have a disadvantage of a limited dynamic range and a bad low frequency response. In the manufacturing process of a loudspeaker, several steps are needed to assemble the static driver part, comprising of at least the magnet, and elements such as pole pieces, back plates and top plates.

SUMMARY OF THE INVENTION

The present invention provides for an improved speaker unit. The speaker unit is cost effective to manufacture and allows for modular design.

The present invention seeks to provide an improved speaker unit solving at least in part the aforementioned problems, wherein the speaker unit has a simple structural design, and hence have advantages over prior art speaker units in both technical sense and in cost efficiency. In accordance with the present invention, a more powerful and efficient speaker unit is provided without having a too high inductance, i.e. power can be increased without a (significant) increase in inductance. Further, the speaker unit exhibits a high level of modularity in that membrane drivers with varying performance specifications can be cost-effectively produced and modularly assembled into the speaker unit efficiently to meet specific customer demands.

According to the present invention, a speaker unit as defined above is provided comprising a speaker frame with a major front surface and an opposing major back surface, a membrane movably arranged in the major front surface along a main speaker axis substantially perpendicular to the major front surface; one or more drive units configured to drive the membrane, wherein each drive unit of the one or more drive units comprises a driver static part and a driver moving part, wherein the driver static part is mounted to the speaker frame and wherein the driver moving part is connected to the membrane; wherein the driver static part comprises an tubular shell enclosing a chamber and having one or more magnets arranged in the chamber, and wherein the driver moving part is moveably arranged along the tubular shell.

SHORT DESCRIPTION OF DRAWINGS

The present invention will be discussed in more detail below, with reference to the attached drawings, in which FIG. 1 shows a cross section of a speaker unit according to an embodiment of the present invention;

Figure 4A:
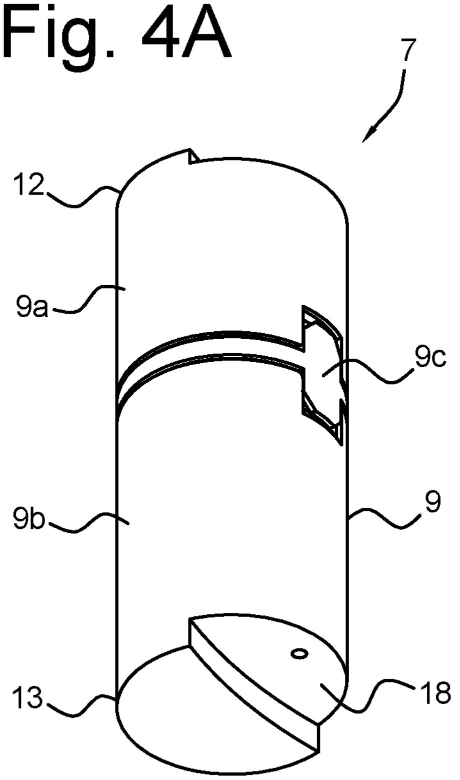
Figure 4B:
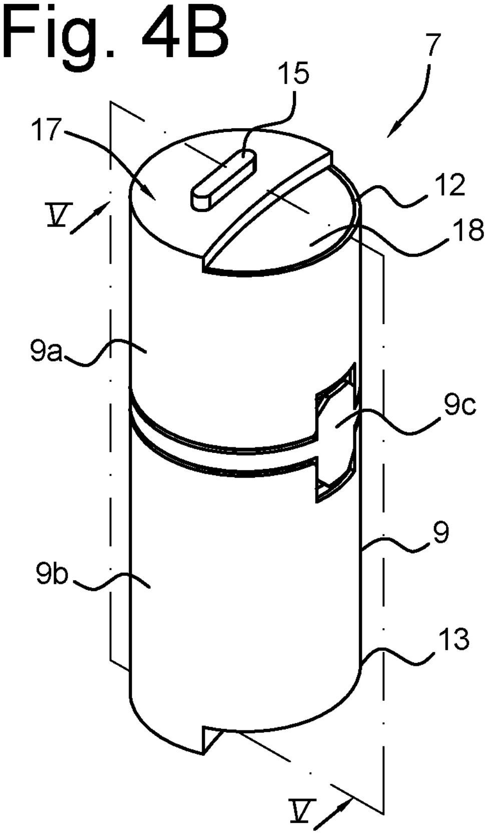
Figure 5:
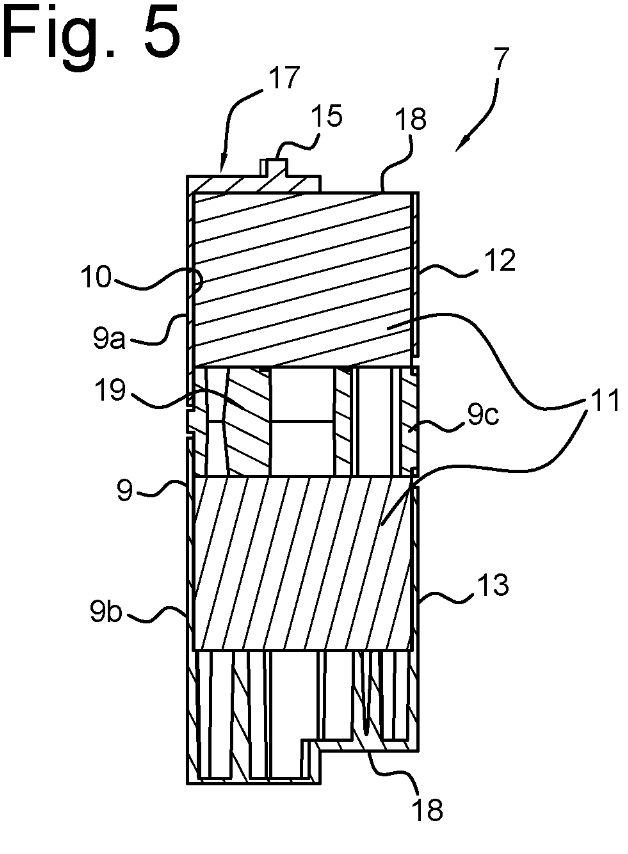
Figure 6A:
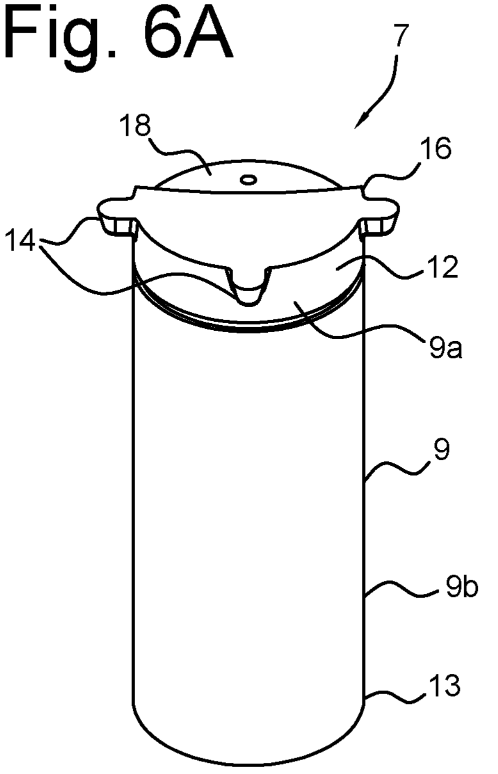
Figure 6B:
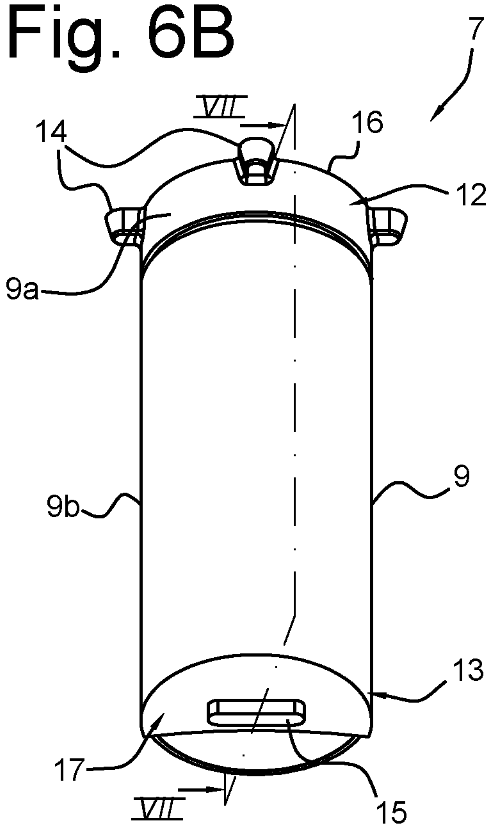
Figure 7:
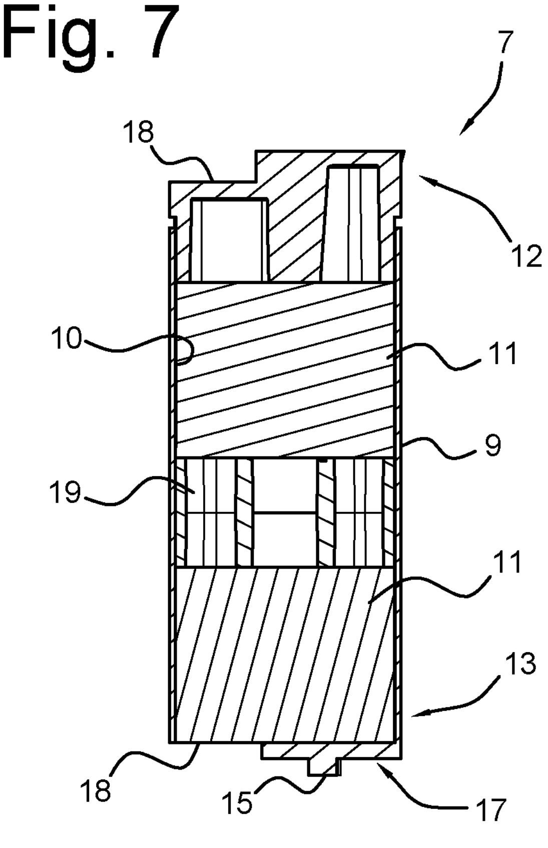

FIGS. 4A and 4B each show a 3D-view of a driver static part of a drive unit according to a second embodiment of the present invention;

FIG. 5 shows a cross section of a driver static part of a drive unit according to the second embodiment of the present invention;

FIGS. 6A and 6B each show a 3D-view of a driver static part of a drive unit according to a third embodiment of the present invention;

FIG. 7 shows a cross section of a driver static part of a drive unit according to the third embodiment of the present invention.

DESCRIPTION OF EMBODIMENTS

The present invention provides for an improved loudspeaker unit having a simple structural design, and hence have advantages over prior art loudspeakers in both technical sense and in cost efficiency. Prior art electrodynamic loudspeakers use magnets and a magnetic circuit of pole pieces, a back plate and a top plate, which channel the magnetic field into a magnetic gap. In the magnetic gap a voice coil is positioned which is mechanically coupled to a conus producing the sound waves. Other principles are used in loudspeakers of the electrostatic type and planar loudspeakers. For electrodynamic type of loudspeakers, the inductance increases when increasing the power capacity of the loudspeaker, the sensitivity is relatively limited and the structure requires a large format in view of the maximum sound level that can be produced. The electrostatic and planar type of loudspeakers have a disadvantage of a limited dynamic range and a bad low frequency response. In the manufacturing process of a loudspeaker, several steps are needed to assemble the static driver part, comprising at least the magnet, and in the principles as described above, elements such as pole pieces, back plates and top plates. In accordance with the present invention embodiments, a more powerful and efficient loudspeaker unit is provided without having a too high inductance, i.e. power can be increased without a (significant) increase in inductance. Furthermore, due to the absence of a closed magnetic circuit, the dimensions of the loudspeaker unit can be relatively small. Since the loudspeaker of the present invention has multiple motors, and within the magnet circuit per driver static part, at least two magnets which are interacting with each other, it is beneficial to have the driver static part be a self-containing sub-assembly. This sub-assembly comprises the elements needed to facilitate the correct positioning of the several magnets along the longitudinal axis and axes perpendicular to the longitudinal axis. the first alignment direction is important to create as high as possible linear motion over the full excursion range of the driver moving part. The second alignment direction is important to prevent 'rub and buzz' (physical contact between the driver static part and the driver moving part), which would decrease the sound quality and eventually break the loudspeaker. Furthermore, the sub-assembly facilitates the space needed between the multiple magnets within the sub-assembly. It could be facilitated by a separate part which is mounted in the sub-assembly, or the shell which holds the magnets facilitates the magnet distance itself.

In a loudspeaker which comprises at least one driver static part which in its turn comprises multiple magnets that are magnetically interacting with each other, it is not possible to magnetize the driver static part after the multiple magnets are assembled into the driver static part (in the assembly process of a conventional speaker magnetization happens after several assembly steps are made to increase the convenience of assembly). The magnets used are pre-magnetized. The present invention allows for convenient manufacturing of the sub-assembly within the speaker frame, since the magnets which are interacting with each other, are now fixed in place within the sub-assembly, and are not able to move in relation to each other. There are no pushing or pulling magnetic forces involved when creating the assembly of the driver static part and the frame.

The driver static part sub-assembly comprises several elements on the areas that are being mounted within the speaker frame, which facilitate correct alignment between the frame, driver static part and the driver moving part.

The driver static part sub-assembly has several exemplary embodiments:

1. A single shell with a small wall thickness, having a height which is dictated by the height of the multiple magnets, the magnet separation distance, and the thickness of the top and bottom part of the shell. At least one of the sides of the shell needs to be open so the content of the shell can be added: the multiple magnets and the magnet separator. This open side needs to be sealed after the contents are added, to assure that the contents remain in place.
2. A shell which is cut perpendicular to the longitudinal axis, comprising a top shell part, a shell connecting part, and a bottom shell part. The shell connecting part facilitates the magnet distance between the multiple magnets.
3. A shell which is cut along the longitudinal axis, the shell itself facilitating the magnet separation distance, and the seal from both ends of the shell. Since the magnets are being mounted from the side instead of from the top, there is no need for a separate lid on top of the shell.

Turning to the figures, showing a speaker unit 1 according to the present invention comprising a speaker frame 2 with a major front surface 3 and an opposing major back surface 4, a membrane 5 movably arranged in the major front surface 3 along a main speaker axis A substantially perpendicular to the major front surface 3. One or more drive units 6 are configured to drive the membrane 5, wherein each drive unit of the one or more drive units 6 comprises a driver static part 7 and a driver moving part 8, wherein the driver static part 7 is mounted to the speaker frame 2 and wherein the driver moving part 8 is connected to the membrane 5. Wherein the driver static part 7 comprises a tubular shell 9 enclosing a chamber 10 and having one or more magnets 11 arranged in the chamber 10, and wherein the driver moving part 8 is moveably arranged along the tubular shell 9.

According to the invention, the tubular shell 10 allows convenient placement of magnets 11 in the driver static part 7 in modular fashion. That is, according to specification the magnets 11 can be chosen accordingly and conveniently placed in the tubular shell 9, which is then easily connected to the speaker frame 2.

Referring to the figures, in an embodiment, the driver static part 7 comprises a first end 12 and an opposing second end 13 for being mounted to the speaker frame 2, wherein the first and/or the second end 12, 13 comprises one or more protrusions 14, 15 and the speaker frame 2 comprises associated surface recesses for congruent engagement with the respective one or more protrusions 14, 15. The one or more protrusions 14, 15 allow for convenient orientation of the driver static part 7 and as such proper orientation of the magnet 11.

Figure 1:
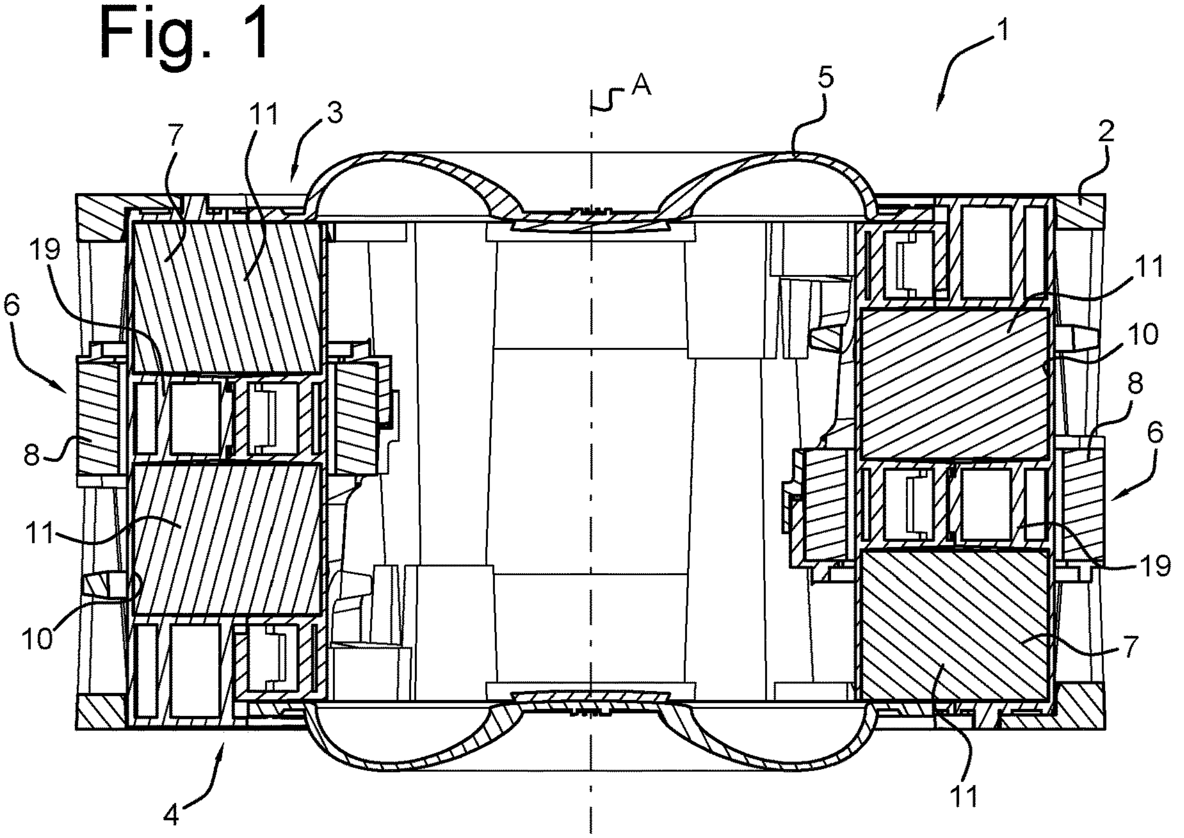
Figure 2:
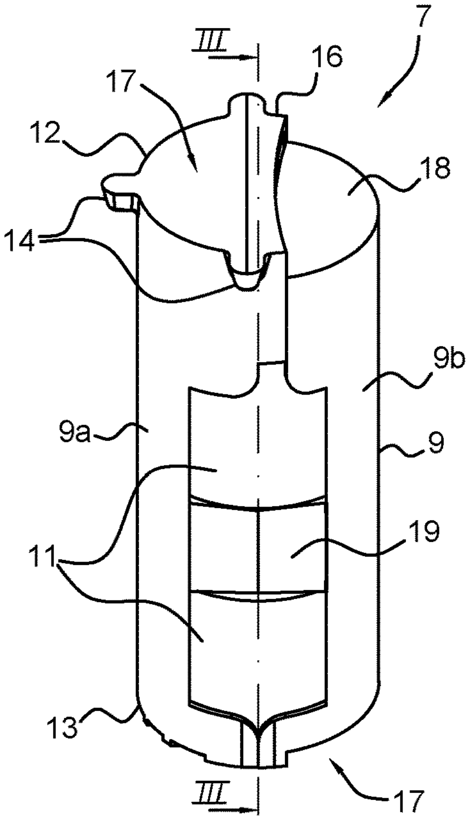
FIG. 2 shows a 3D-view of a driver static part of a drive unit according to a first embodiment of the present invention.

As shown in FIG. 2, 6A, 6B, in an embodiment the one or more protrusions 14 are arranged along an outer perimeter 16 of the first and/or second end 12, 13 for congruent engagement with the speaker frame 2.

As shown in FIG. 4A, 4B, in an embodiment the one or more protrusions 15 are arranged along an end side 17 of the first and/or second end 12, 13, the end side 17 being perpendicular to the main speaker axis A.

The one or more protrusions 14, 15 allow for cooperative engagement with the speaker frame 2, e.g. with the front and back major surface 3, 4, to facilitate accurate alignment of the driver static part 7 with respect to the speaker frame 2.

As shown in FIG. 2 to 7, in an embodiment the first and/or second end 12, 13 comprises a recess 18 for receiving a peripheral part of the membrane 5. This also allows for further secure alignment of the driver static part 7 with respect to the speaker frame 2.

In an embodiment, the tubular shell 9 comprises a first and a second shell part 9*a*, 9*b*, wherein the first and second shell parts 9*a*, 9*b* are connected together enclosing the chamber 10.

Having two shell parts 9*a*, 9*b* allows for easy placement of magnets 11 in the tubular shell 9 and in particular the chamber 10 thereof, thereby facilitating the assembly process in modular manner.

Figure 3:
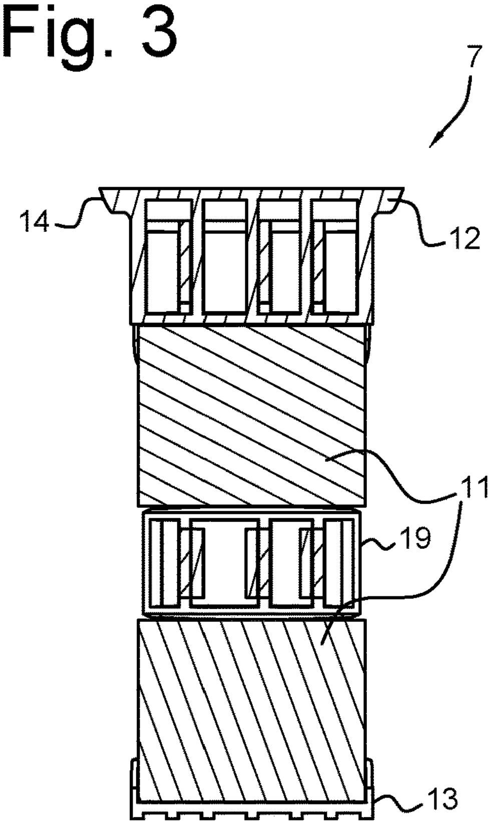
FIG. 3 shows a cross section of a driver static part of a drive unit according to the first embodiment of the present invention.

As shown in FIGS. 2 and 3, in an embodiment the first and second shell parts 9*a*, 9*b* are longitudinally connected to one another along the main speaker axis A forming a longitudinal split tubular shell 9.

As shown in FIG. 4 to 7, in an embodiment the first and second shell parts 9*a*, 9*b* are connected to one another laterally with respect to the main speaker axis A forming a lateral split tubular shell.

In an embodiment, the speaker unit 1 further comprises a shell connecting part 9*c* arranged between the first and the second shell parts 9*a*, 9*b*. See FIGS. 4A, 4B, and 5. The shell connecting part 9*c* may allow good connection between the first and the second shell parts 9*a*, 9*b* and may allow convenient placement and/or spacing of the one or more magnets in the chamber 10.

In an embodiment, the tubular shell 9 comprises a non-magnetic spacer member 19 arranged in the chamber 10 configured for positioning and/or spacing apart of the one or more magnets 11 in the chamber 10.

In an embodiment, wherein the tubular shell 9 comprises a shell opening configured to have access to the chamber 10. This provides easy access to the chamber 10 for placing the one or more magnets 11.

In an embodiment, the first and/or the second shell part 9*a*, 9*b* comprises the shell opening for easy placement of the magnets 11. That is, the first and/or second shell parts 9*a*, 9*b* may be provided with a sufficiently large opening to allow convenient placement of the one or more magnets 11.

In an embodiment, the tubular shell 9 is made of non-magnetic material, e.g. plastic material, to not interfere with magnetic fields In an exemplary embodiment, the tubular shell 9 has a minimum wall thickness of 0.01 mm and a maximum wall thickness of 5 mm. This provides for a sufficiently small and slender form factor yet provide sufficient strength to the tubular shell 9.

The present invention has been described above with reference to a number of exemplary embodiments as shown in the drawings. Modifications and alternative implementations of some parts or elements are possible, and are included in the scope of protection as defined in the appended claims.

The invention claimed is:

1. A speaker unit comprising:
- a speaker frame with a major front surface and an opposing major back surface;
- a membrane movably arranged in the major front surface along a main speaker axis substantially perpendicular to the major front surface; and
- one or more drive units configured to drive the membrane, each of the drive unit(s) comprising:
  - a driver static part coupled to the speaker frame, the driver static part including a shell having an outer surface and one or more magnets at least partially enclosed within the shell; and
- a driver moving part coupled to the membrane and radially surrounding the outer surface of the shell, wherein the driver moving part is arranged to move with respect to the outer surface of the shell in a direction aligned with the main speaker axis.

2. The speaker unit of claim 1, wherein the shell is tubular with an opening.

3. The speaker unit of claim 1, wherein the shell has an open side through which the one or more magnets can be inserted.

4. The speaker unit of claim 1, wherein the one or more magnets comprises a first magnet and a second magnet arranged coaxially within the shell.

5. The speaker unit of claim 4, further comprising a non-magnetic spacer member arranged in the shell configured for positioning or spacing apart the first and second magnets.

6. The speaker unit of claim 1, wherein the shell is made of non-magnetic material.

7. The speaker unit of claim 1, wherein the shell has a minimum wall thickness of 0.01 mm and a maximum wall thickness of 5 mm.

8. The speaker unit of claim 1, wherein the driver static part comprises a first end and an opposing second end mountable to the speaker frame, wherein the first and/or the second end comprises one or more protrusions and the speaker frame comprises associated surface recesses for congruent engagement with the respective one or more protrusions.

9. The speaker unit of claim 8, wherein the one or more protrusions are arranged along an outer perimeter of the first and/or second end for congruent engagement with the speaker frame.

10. The speaker unit of claim 8, wherein the one or more protrusions are arranged along an end side of the first and/or second end, the end side being perpendicular to the main speaker axis.

11. The speaker unit of claim 8, wherein the first and/or second end comprises a recess for receiving a peripheral part of the membrane.

12. A speaker unit comprising:
- a frame;
- a membrane coupled to the frame; and
- at least one drive unit coupled to the frame and configured to move the membrane inward and outward along an axis, the at least one drive unit comprising:
  - one or more stationary magnets;
  - a shell having an outer surface and at least partially enclosing the one or more stationary magnets; and
  - a driver moving part transversely surrounding the outer surface of the shell and configured to move axially with respect to the outer surface of the shell and the one or more stationary magnets, the driver moving part coupled to the membrane.

13. The speaker unit of claim 12, wherein the shell is tubular with an opening.

14. The speaker unit of claim 12, wherein the shell has an open side through which the one or more magnets can be inserted.

15. The speaker unit of claim 12, wherein the one or more stationary more magnets comprises a first magnet and a second magnet arranged coaxially within the shell.

16. The speaker unit of claim 15, further comprising a non-magnetic spacer member arranged in the shell configured for positioning or spacing apart the first and second magnets.

17. A speaker unit comprising:
- a frame;
- a membrane coupled to the frame; and
- a drive unit coupled to the frame and configured to move the membrane along an axis, the drive unit comprising:
  - one or more magnets received within a chamber having an outside surface; and
  - a membrane actuating element surrounding a transverse perimeter of the outer surface of the shell, connected to the membrane and configured to move axially with respect to the one or more magnets and the outer surface of the chamber.

18. The speaker unit of claim 17, further comprising a shell defining the chamber.

19. The speaker unit of claim 18, wherein the shell has an open side through which the one or more magnets can be inserted.

20. The speaker unit of claim 17, wherein the one or more magnets comprises a first magnet and a second magnet arranged coaxially within the chamber.

21. The speaker unit of claim 20, further comprising a non-magnetic spacer member arranged in the chamber configured for positioning or spacing apart the first and second magnets.

* * * * *